(12) United States Patent
Chan

(10) Patent No.: US 7,778,152 B2
(45) Date of Patent: Aug. 17, 2010

(54) NON-INTRUSIVE METHOD AND SYSTEM FOR COUPLING POWERLINE COMMUNICATIONS SIGNALS TO A POWERLINE NETWORK

(75) Inventor: Tat Keung Chan, South San Francisco, CA (US)

(73) Assignee: Asoka USA Corporation, Foster City, CA (US)

( * ) Notice: Subject to any disclaimer, the term of this patent is extended or adjusted under 35 U.S.C. 154(b) by 202 days.

(21) Appl. No.: 12/031,372

(22) Filed: Feb. 14, 2008

(65) Prior Publication Data

US 2009/0207924 A1    Aug. 20, 2009

(51) Int. Cl.
*H04J 11/00* (2006.01)

(52) U.S. Cl. .................. 370/208; 370/210; 370/463; 340/310.11; 709/250; 709/218

(58) Field of Classification Search .................. 370/210, 370/463; 340/310.01, 310.11, 538.11; 375/260
See application file for complete search history.

(56) References Cited

U.S. PATENT DOCUMENTS

| | | | | |
|---|---|---|---|---|
| 3,942,170 A | * | 3/1976 | Whyte | .................. 340/310.17 |
| 6,965,303 B2 | * | 11/2005 | Mollenkopf | ................. 370/485 |
| 7,016,368 B2 | | 3/2006 | Binder | |
| 7,035,280 B2 | | 4/2006 | Binder | |
| 7,095,756 B2 | | 8/2006 | Binder | |
| 2002/0039388 A1 | * | 4/2002 | Smart et al. | .................. 375/260 |
| 2002/0060624 A1 | * | 5/2002 | Zhang | ................... 340/310.01 |
| 2005/0076148 A1 | * | 4/2005 | Chan et al. | .................. 709/246 |
| 2005/0208825 A1 | * | 9/2005 | Chan | .......................... 439/505 |

* cited by examiner

*Primary Examiner*—Ricky Ngo
*Assistant Examiner*—Rasheed Gidado
(74) *Attorney, Agent, or Firm*—Baker Botts L.L.P.

(57) ABSTRACT

In one embodiment, a powerline system includes a data connection, a powerline module coupled to the data connection, a physical socket coupled to the powerline module and including a female connector device, a male connector device inserted into the female connector device, and a pair of wires coupled to and extending from the male connector device. The female connector device comprises a first female connector and a second female connector. The male connector device comprises a first male connector coupled to the first female connector and a second male connector coupled to the second female connector. The first wire of the pair of wires is coupled to and extending from the first male connector, and the second wire of the pair of wires is coupled to and extending from the second male connector respectively.

23 Claims, 13 Drawing Sheets

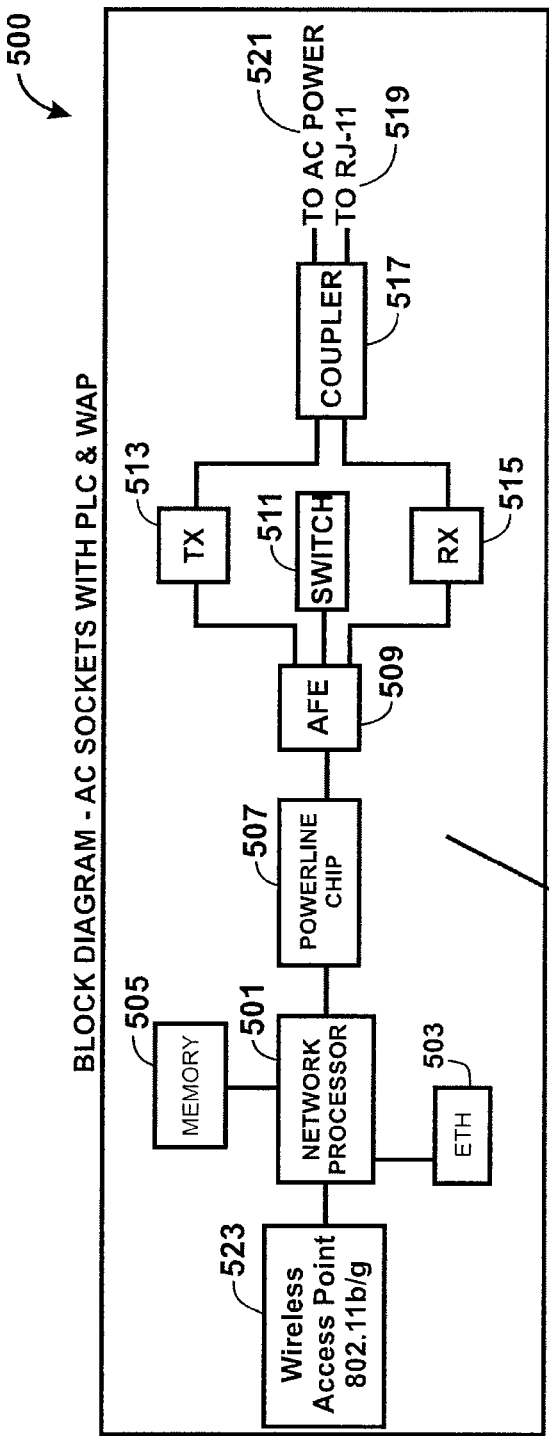
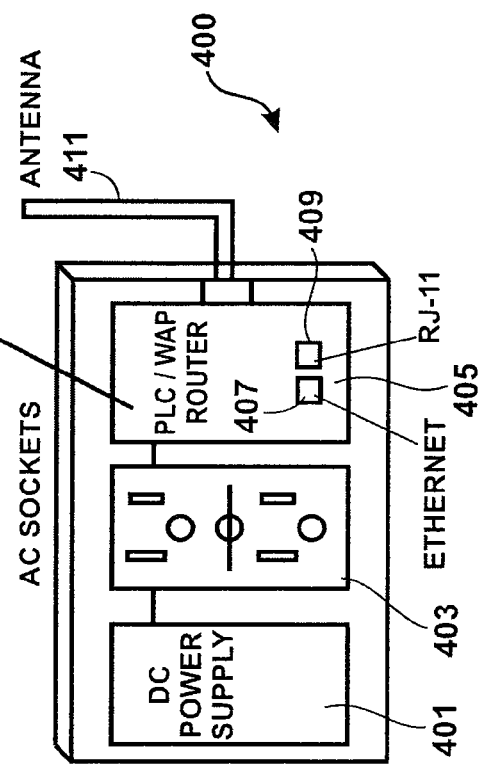
FIGURE 5
FIGURE 4

NON-INTRUSIVE METHOD AND SYSTEM FOR COUPLING POWERLINE COMMUNICATIONS SIGNALS TO A POWERLINE NETWORK

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates generally to power line networking techniques. More particularly, the invention provides an apparatus for a high speed power line network using a non-intrusive coupling device, which interfaces between a powerline module and powerline network. Merely by way of example, the invention has been applied in a local area network environment, but it would be recognized that other applications exist. The invention can also be applied to building area networking, home networking, office networking, apartments, any combination of these, and other networking applications.

Telecommunication techniques have been around for numerous years. In the early days, a communication technique known as telegraph was developed. Telegraph generally transferred information from one geographical location to another geographical location using electrical signals in the form of "dots" and "dashes" over transmission lines. An example of commonly used electrical signals is Morse code. Telegraph has been, for the most part, replaced by telephone. The telephone was invented by Alexander Graham Bell in the 1800s to transmit and send voice information using electrical analog signals over a telephone line, or more commonly a single twisted pair copper line. Most industrialized countries today rely heavily upon telephone to facilitate communication between businesses and people, in general.

In the 1990s, another significant development in the telecommunication industry occurred. People began communicating to each other by way of computers, which are coupled to the telephone lines or telephone network or other communication network. These computers or workstations coupled to each other can transmit many types of information from one geographical location to another geographical location. In general, there has been various types of computer networks, including local area networks, commonly called LANs, and wide are networks, commonly called WANs.

Local area networks have been used to connect computers in a smaller geographic region than wide area networks. Most local area networks rely upon dedicated cables to transmit the communication signals through the network. An alternative way of transmitting such communication signals through non-dedicated cables but through a power supply network is referred to as Power line Communication, commonly called PLC. Power line communication relies upon pre-existing power lines that are used to supply electrical power distributed through buildings, such as homes and office structures. Conventional PLC relies upon radio frequency technologies. Although power line communications have been successful in part, many limitations still exist.

For example, power line communication generally has limited capability due to lack of infrastructure. That is, power line networking has not been "mainstream." Power line networking has little or almost no infrastructure. Additionally, power line network devices are lacking and simply do not exist on a wide scale. In conventional office settings in the United States, power line networking is absent and almost non-existent. Powerline networking is also often difficult to integrate in a home or office network environment. These and other limitations have been described throughout the present specification and more particularly below.

From the above, it is seen that improved techniques for power line networks are highly desired.

BRIEF SUMMARY OF THE INVENTION

According to the present invention, techniques for power line networking are provided. More particularly, the invention provides an apparatus for a high speed power line network using a non-intrusive coupling device, which interfaces between a powerline module and powerline network. Merely by way of example, the invention has been applied in a local area network environment, but it would be recognized that other applications exist. The invention can also be applied to building area networking, home networking, office networking, apartments, any combination of these, and other networking applications.

In a specific embodiment, the present invention provides a powerline system including non-intrusive coupling for powerline communications. The system has a powerline module couple to a data connection. In a specific embodiment, the powerline module is configured to process a first data signal in a first format to a second data signal in a second format, which is an OFDM format capable of being configured for transmission through one or more powerline cables. The system has a physical socket coupled to the powerline module. In a specific embodiment, the physical socket has a female connector device, which includes at least a first connector and a second connector. In a specific embodiment, the first connector and the second connector are electrically coupled to the second data signal in the second format. The system also has a male connector device, which is inserted into the female connector device. The male connector includes at least a first male connector and a second male connector are coupled respectively to the first connector and the second connector.

In a specific embodiment, a first wire coupled to the first male connector and a second wire coupled to the second male connector. In a preferred embodiment, the system includes a twisted pair of wires including at least the first wire and the second wire. Preferably, the twisted pair of wires extend from the male connector and have a length of no greater than fifty feet, but can be other lengths depending upon the specific embodiment. The system has a loop configured from the first wire connected to the second wires and extends as the twisted pair of wires. In a specific embodiment, the first wire is coupled to the first male connector and the second wire is coupled to the second male connector. The system also has a first powerline cable and a second powerline cable coupled to the first powerline cable. The system has a first inductive coupling device coupling a first portion of the first wire within a vicinity of the loop to the first powerline cable and a second inductive coupling device coupling a first portion of the second wire within a vicinity of the loop to the second powerline cable. In a preferred embodiment, the system has a first mechanical hinge and connector device configured to couple the first inductive coupling device to the portion of the first wire within the vicinity of the loop without causing physical damage to the portion of the first wire and a second mechanical hinge and connector device configured to couple the second inductive coupling device to the portion of the second wire within the vicinity of the loop without causing physical damage to the portion of the second wire.

One or more benefits can be achieved using the present invention over conventional techniques. The present invention can be applied using conventional components from computer networking and hardware technologies. Additionally, the invention can be applied to pre-existing power line structures without substantial modification. Preferably, the present system and method are easy to implement and also allows for power line networking capabilities and power plug abilities using the same apparatus according to a specific embodiment. In a preferred embodiment, the powerline network can be implemented on home or office networks in a non-intrusive manner. In a preferred embodiment, the present invention provides a method and device that allows for coupling of a powerline device onto pre-existing powerline cables and/or wires within a building structure without cutting wires, splicing, or other attachment techniques. Depending upon the embodiment, one or more of these benefits may exist. These and other benefits have been described throughout the present specification and more particularly below.

Various additional objects, features and advantages of the present invention can be more fully appreciated with reference to the detailed description and accompanying drawings that follow.

BRIEF DESCRIPTION OF THE DRAWINGS

FIG. 4 is a simplified diagram of a powerline apparatus according to an embodiment of the present invention;

FIG. 5 is a simplified block diagram of a power line module for the power line and AC power outlet according to an embodiment of the present invention;

DETAILED DESCRIPTION OF THE INVENTION

According to the present invention, techniques for power line networking are provided. More particularly, the invention provides an apparatus for a high speed power line network using a non-intrusive coupling device, which interfaces between a powerline module and powerline network. Merely by way of example, the invention has been applied in a local area network environment, but it would be recognized that other applications exist. The invention can also be applied to building area networking, home networking, office networking, apartments, any combination of these, and other networking applications.

Figure 1:
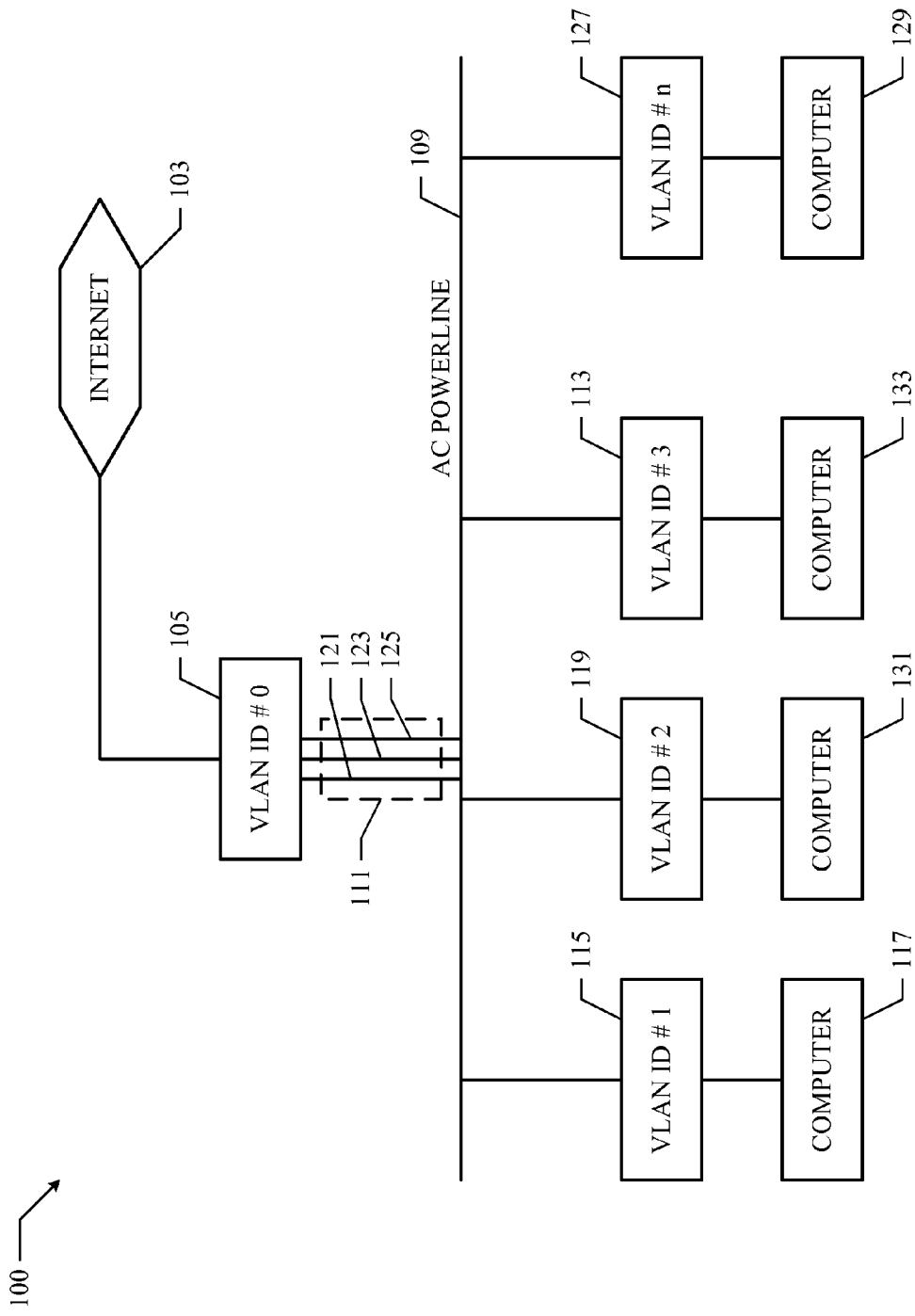
FIG. 1 is a simplified diagram of a power line system according to an embodiment of the present invention.

FIG. 1 is a simplified diagram of a power line system according to an embodiment of the present invention. This diagram is merely an example, which should not unduly limit the scope of the claims herein. One of ordinary skill in the art would recognize many variations, alternatives, and modifications. As shown, the system 100 for power line networking is included. The system 100 has an external data source 103, which is derived from a world wide networks of computers. As merely an example, the data source can be the Internet or other like entity. The system includes a first power line 121, a second power line 123, and a third power line 125, each of which corresponds to a phase. Each of the power lines is often bundled together and represented by reference numeral 111.

Referring again to FIG. 1, the system includes a gateway 105 coupled between the data source 103 and an AC power line 109 according to a specific embodiment. The AC power line 109 couples to a plurality of power line devices 115, 119, 113, 127 numbered from 1 through N, where N is an integer greater than 2, according to a specific embodiment. Each of the power line devices is coupled to a client device or a plurality of client devices to define a "segment" on the power line network. As shown, power line device 119 couples to client device 131. Power line device 113 couples to client device 133. Power line device 127 couples to client device 129. Power line device 115 couples to client device 117. Depending upon the specific embodiment, the client device can be a personal computer, a wireless device, a lap top computer, an Internet phone, an Internet appliance (e.g., refrigerator, stereo, television set, clock, digital paintings), any combinations of these, and others. Of course, one of ordinary skill in the art would recognize. Further details of the gateway and power line device can be found throughout the present specification and more particularly below.

Figure 2:
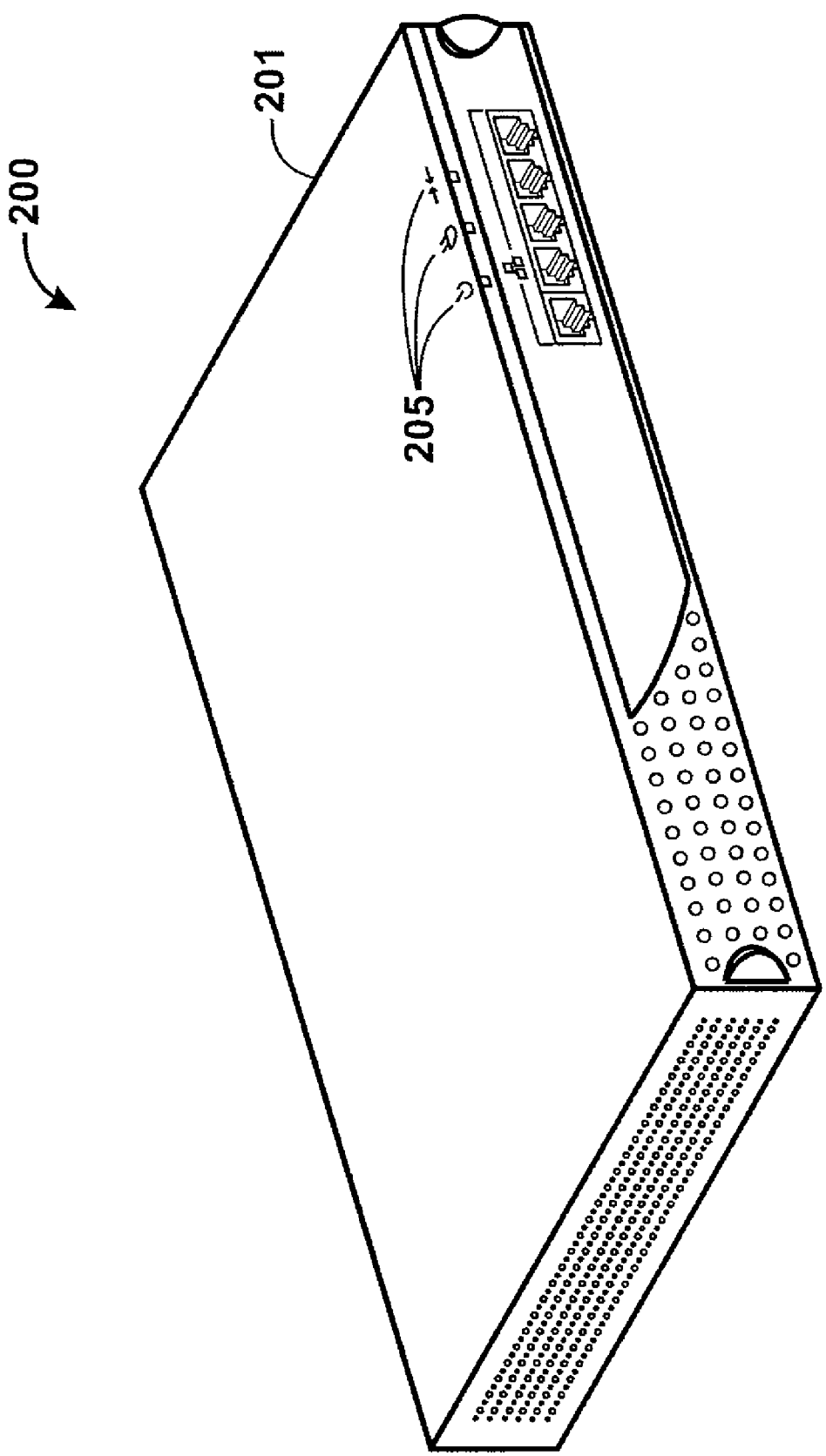
FIG. 2 is a simplified diagram of a power line gateway system according to an embodiment of the present invention.

FIG. 2 is a simplified diagram of a power line gateway system 200 according to an embodiment of the present invention. This diagram is merely an example, which should not unduly limit the scope of the claims herein. One of ordinary skill in the art would recognize many variations, alternatives, and modifications. As shown, the gateway system 200 has a housing 201 including at least three input/output ports 205, which can be coupled to external power lines according to a specific embodiment. In a specific embodiment, one or more power line signals is derived from the housing.

In a preferred embodiment, the power line signal coupled to each of the three input/output ports. That is, the power line signal is injected directly into each of the phases. In a specific embodiment, the present power line signal is injected directly into each of the phases, where the phases are not coupled to each other upon injection according to a specific embodiment. The three input/output ports include a first phase input/output port coupled to the first power line, a second phase input/output port coupled to the second power line, and a third input/output port coupled to the third power line. Of course, there can be other variations, modifications, and alternatives. Further details of the gateway system can be found throughout the present specification and more particularly below.

Figure 3:
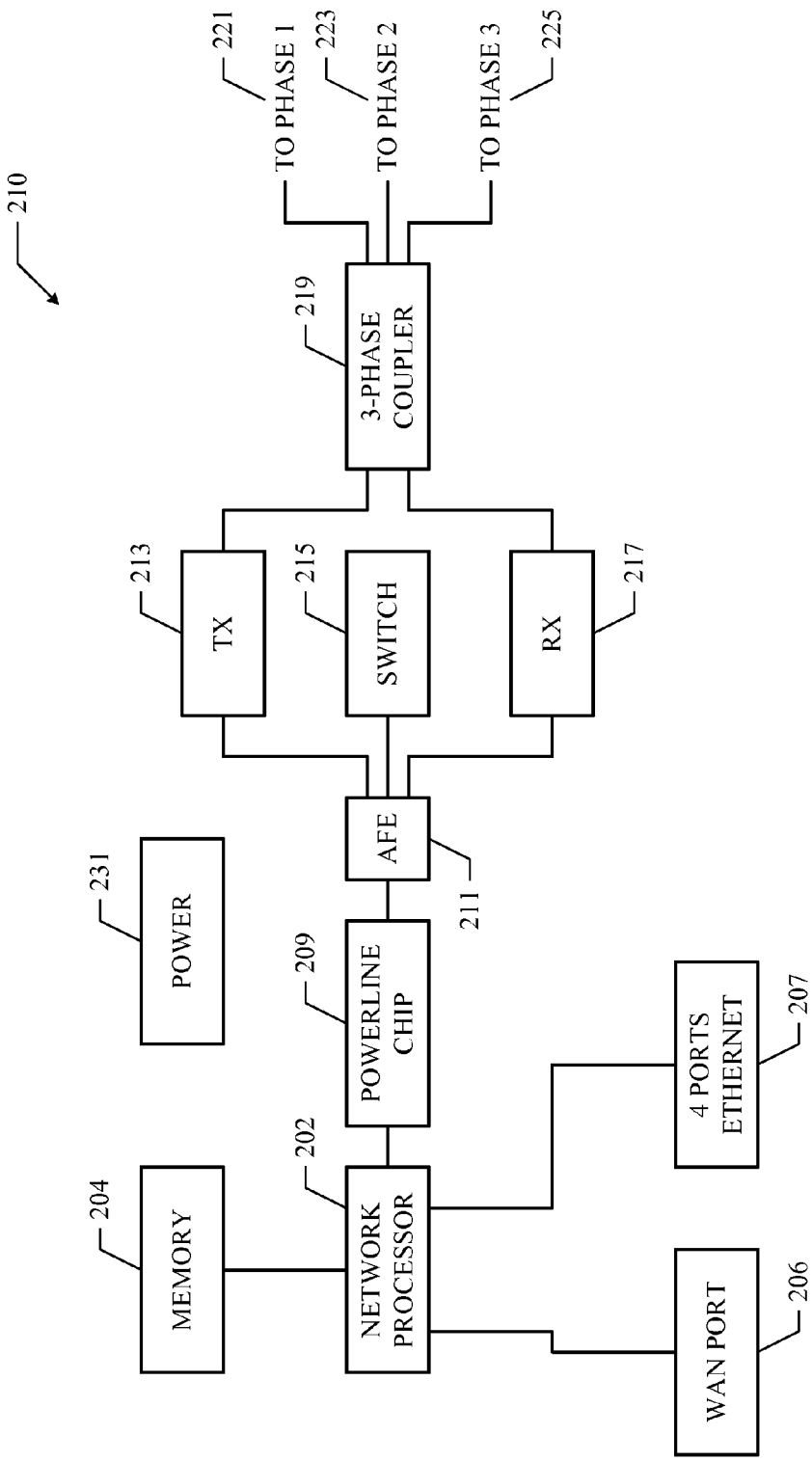
FIG. 3 is a simplified block diagram of the power line gateway system of FIG. 2 according to a specific embodiment.

FIG. 3 is a simplified block diagram 210 of the power line gateway system of FIG. 2 according to a specific embodiment. This diagram is merely an example, which should not unduly limit the scope of the claims herein. One of ordinary skill in the art would recognize many variations, alternatives, and modifications. As shown, the system has a network processor 202 within the housing and coupled to the power line signal via power line chip 209. In a specific embodiment, the network processor includes a network connector input/output port 206 coupled the network processor and coupled to the housing. In a preferred embodiment, the input/output port 206 couples to a data network, which couples to a wide area network and/or world wide area network, as noted. The network processor also includes one or more input/output ports for one or more local area networks 207. The network processor has an interface to a memory device 204, which can include a dynamic random access memory, static random access memory, or other types, depending upon the specific embodiment. As merely an example, the network processor can be any suitable type such as the ADM5 120 Series manufactured by Infineon Technologies AG of Germany, but can also be others. In a specific embodiment, the system also has a power module 231, which provides suitable power (e.g., voltage/current) to each of the elements described herein. Of course, one of ordinary skill in the art would recognize other variations, modifications, and alternatives.

In a preferred embodiment, the system has the power line chip 209, called herein "PLC" chip, which is coupled between the network processor and analog front end 211 device. As shown, the PLC is coupled to the analog front end (AFE) module 211. The AFE module interfaces between the chipset and a three phase coupler 219 according to a specific embodiment. Between the AFE and coupler is transmit 213 and receive 217 devices according to a specific embodiment. A switching device couples to the AFE chip and transmit device according to a specific embodiment. Further details of the power line chip, AFE, TX/RX devices, and coupler are provided throughout the present specification and more particularly below.

In a specific embodiment, the power line device can be any suitable power line integrated circuit chips and/or chip sets. As merely an example, the power line chip is an integrated circuit chip sold under part number 5500CS manufactured by INTELLON CORPORATION of Florida. Here, the chip can be a single-chip power line networking controller with integrated MII/GPSI, USB. The chip interfaces with Ethernet interfaces, among others. Preferably, there is at least a 80 Mbps data rate on the power line, although others may desirable. Additional features include an Integrated 10-bit ADC, 10-bit DAC and AGC, a selectable MDI/SPI PHY management interface, general purpose 8-wire serial PHY data interface. Preferably, the signal processing uses Orthogonal Frequency Division Multiplexing (OFDM) for high data reliability, as well as adaptive channel characterization, Viterbi and block coding. In alternative embodiments, the power line device can also include other chip designs that are suitable for the present methods and systems. Of course, one of ordinary skill in the art would recognize other variations, modifications, and alternatives.

In a specific embodiment, the three phase coupler can be any suitable device capable of injecting power line signals directly into each of the three phases 221, 223, 225 independently. In a specific embodiment, the coupler can be an inductive coupler and/or capacitive coupler, but may be others. In a preferred embodiment, each of the three phases receives/transmits power line signals directly (and are not coupled to each other at the gateway or within a vicinity of the gateway) to more efficient signal transfer and receive processes. As merely an example, the coupler can be either inductive and/or capacitive, but can be others. As noted, the three phase coupler is merely an example and should not unduly limit the scope of the claims herein.

FIG. 4 is a simplified diagram of a power line apparatus 400 according to an embodiment of the present invention. This diagram is merely an example, which should not unduly limit the scope of the claims herein. One of ordinary skill in the art would recognize many variations, alternatives, and modifications. As shown, the apparatus can be provided in housing 400, which is adapted to a wall or other like structure according to a specific embodiment. As shown, the housing includes a power line device, which is provided in a module will be further described throughout the present specification and more particularly below.

The powerline device is coupled to input/outputs. Such input/outputs include an RJ-11-type connector 409, an Ethernet connector 407, and others, if desired. The Ethernet connector often associated with a CAT 5-type connector. Each of these can be provided on a face plate of the apparatus. Of course, the connectors can also be provided on other spatial locations of the apparatus. The apparatus also includes one or more power outlets 403, commonly termed AC outlets. The AC outlets are provided for AC power to any electronic devices that require such AC power. The housing also has a DC power supply that provides power to the module. In a specific embodiment, the housing also includes a wireless antenna, which is coupled to the module. The module includes a wireless device coupled to the antenna. Each of these elements is provided within the housing, which includes at least a pair of power plugs to be inserted into an AC power outlet provided in a power line network according to a specific embodiment. Further details of the housing can be found throughout the present specification and more particularly below.

FIG. 5 is a simplified block diagram of a power line module provided in the housing according to an embodiment of the present invention. This diagram is merely an example, which should not unduly limit the scope of the claims herein. One of ordinary skill in the art would recognize many variations, alternatives, and modifications. In a preferred embodiment, the module is provided within a interior region of the housing. As shown, the module has a network processor 501 within the housing and coupled to the power line signal via power line chip 507. In a specific embodiment, the network processor includes one or more input/output ports for one or more local area networks via line or lines 521. In a specific embodiment, the local area network can be Ethernet and/or other like technology. The network processor has an interface to a memory device 505, which can include a dynamic random access memory, static random access memory, or other types, depending upon the specific embodiment. As merely an example, the network processor can be any suitable type such as the ADM5120 Series manufactured by Infineon Technologies AG of Germany, but can also be others. Of course, one of ordinary skill in the art would recognize other variations, modifications, and alternatives.

In a preferred embodiment, the system has the power line chip 507, called herein "PLC" chip, which is coupled between the network processor and an analog front end 509 device. As shown, the PLC is coupled to the analog front end (AFE) device and/or module. The AFE module interfaces between the PLC chip and a phase coupler 519. according to a specific embodiment. Between the AFE and coupler is transmit 513 and receive 515 devices according to a specific embodiment. A switching device 511 couples to the AFE chip and transmit device according to a specific embodiment. Further details of the power line chip, AFE, TX/RX devices, and coupler are provided throughout the present specification and more particularly below.

In a specific embodiment, the power line device can be any suitable power line integrated circuit chips and/or chip sets. As merely an example, the power line chip is an integrated circuit chip sold under part number 5500CS manufactured by INTELLON CORPORATION of Florida. Here, the chip can be a single-chip power line networking controller with integrated MII/GPSI, USB. The chip interfaces with Ethernet interfaces 503, among others. Preferably, there is at least a 80 Mbps data rate on the power line, although others may desirable. Additional features include an Integrated 10-bit ADC, 10-bit DAC and AGC, a selectable MDI/SPI PHY management interface, general purpose 8-wire serial PHY data interface. Preferably, the signal processing uses Orthogonal Frequency Division Multiplexing (OFDM) for high data reliability, as well as adaptive channel characterization, Viterbi and block coding. In alternative embodiments, the power line device can also include other chip designs that are suitable for the present methods and systems. Of course, one of ordinary skill in the art would recognize other variations, modifications, and alternatives.

In a specific embodiment, the coupler 517 can be any suitable device capable of injecting and/or receiving power line signals to and/from a power line, which is coupled to a power line network. In a specific embodiment, the coupler can be an inductive coupler and/or capacitive coupler, but may be others. As merely an example, the coupler (either inductive and/or capacitive coupler), but can be others. The coupler couples to AC power line 521, which is provided on the powerline network. Additionally, the coupler or other coupling device is coupled to an RF-11 outlet 519 for telephone communication. Of course, there can be many variations, modifications, and alternatives.

In a specific embodiment, the network processor is also coupled to wireless access point device 523. The wireless access point device can be any suitable integrated circuit chip and/or chips, including modules, according to a specific embodiment. The wireless access point device can be an 802.11-type device or other type of wireless transmission/receive device according to a specific embodiment. The wireless access device is coupled to the wireless antenna according to a specific embodiment. Of course, there can be other variations, modifications, and alternatives.

Figure 6:
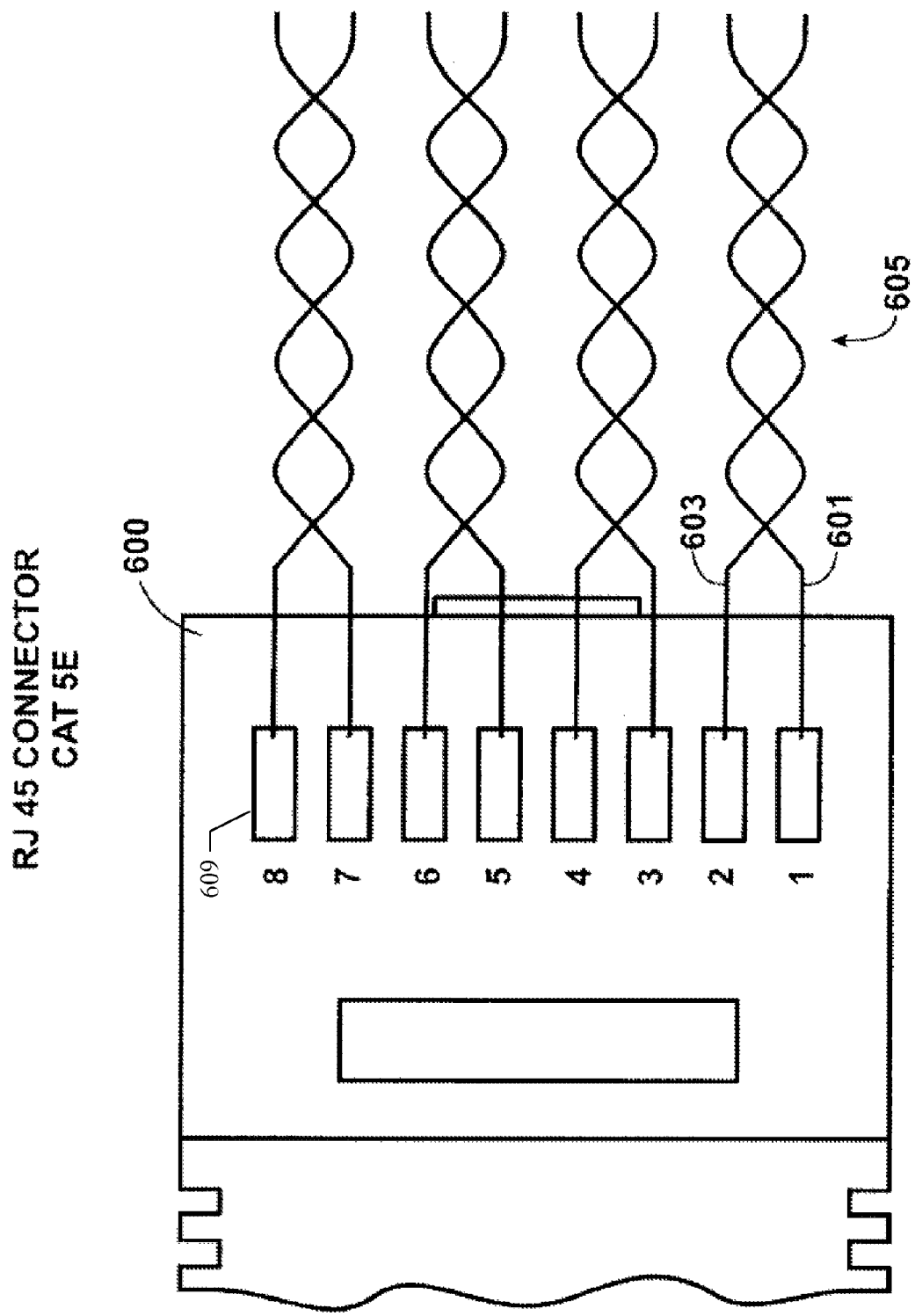
FIG. 6 is a detailed diagram of an physical input/output device of the powerline gateway system of FIG. 3.

FIG. 6 is a detailed diagram of an physical input/output device of the powerline gateway system of FIG. 3. This diagram is merely an example, which should not unduly limit the scope of the claims herein. One of ordinary skill in the art would recognize many variations, alternatives, and modifications. In a specific embodiment, the present invention provides a powerline system including non-intrusive coupling for powerline communications. The system has a powerline module couple to a data connection, e.g., DSL, Internet. In a specific embodiment, the powerline module is configured to process a first data signal in a first format to a second data signal in a second format, which is an OFDM format capable of being configured for transmission through one or more powerline cables. As shown, the system has a physical socket 600 coupled to the powerline module. In a specific embodiment, the physical socket has a female connector device, which includes at least a first connector and a second connector. In a specific embodiment, the first connector and the second connector are electrically coupled to the second data signal in the second format. The system also has a male connector device 609, which is inserted into the female connector device. The male connector includes at least a first male connector and a second male connector are coupled respectively to the first connector and the second connector. In a specific embodiment, a first wire 601 coupled to the first male connector and a second wire 603 coupled to the second male connector.

In a preferred embodiment, the system includes a twisted pair of wires 605 including at least the first wire and the second wire. Preferably, the twisted pair of wires extend from the male connector and have a length of no greater than fifty feet, but can be other lengths depending upon the specific embodiment. As also shown, the male connector also includes third and fourth connectors that couple respective to a pair of twisted pair. The male connector also includes sixth and seventh connectors that couple respectively to a pair of twisted pair. Additionally, the male connector also includes seventh and eight connectors that couple respectively to a pair of twisted pair. Each of the pair of twisted pair couple to a pair of powerlines in the powerline network, as will be described in more detail below. As merely an example, the male connector can be an RF 45 connector or the like depending upon the embodiment.

Figure 6A:
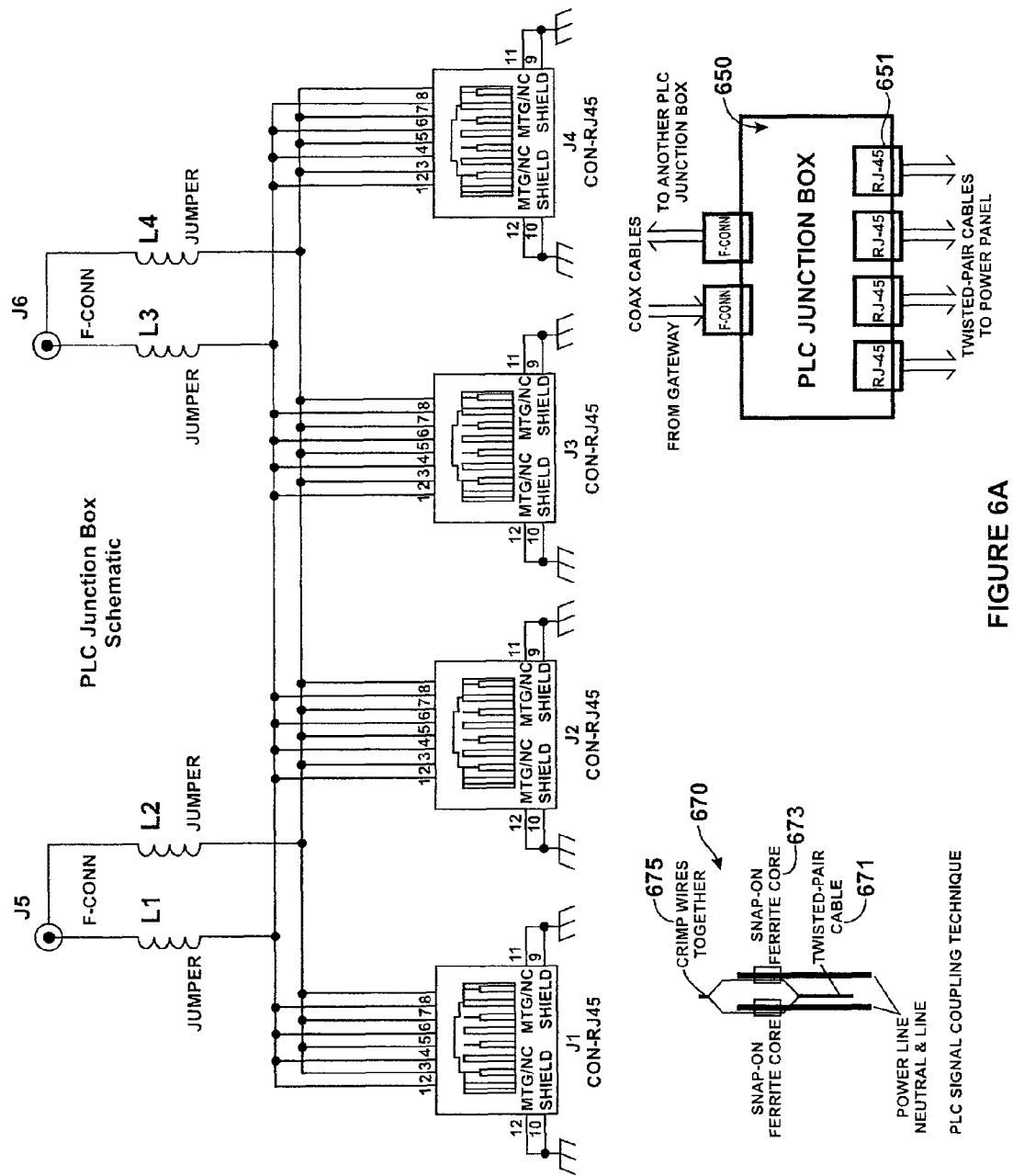
FIG. 6A is a high level diagram of the physical input/output device of the diagram FIG. 6.

FIG. 6A is a high level diagram of the physical input/output device of the diagram FIG. 6. As shown, the diagram includes the powerline junction box 650, including a plurality of RJ-45 connectors 651 that are coupled to twisted pair cables that couple non-intrusively to powerline cables at a powerline junction box. As noted, the RJ-45 connector has been described above. Each of the RJ-45 connectors can be coupled to different powerline cables according to a specific embodiment. As also shown is the PLC junction box schematic according to a specific embodiment. Each of the connectors includes a plurality of connector pairs, which couple respectively to L1 and L2 jumpers from a gateway device. In other embodiments, each of the connectors includes a plurality of pairs, which couple respectively to L3 and L4 jumpers to be provided to another PLC junction box according to a specific embodiment.

Referring to reference numeral 675, each 671 of the twisted pairs is coupled respectively to powerline cables according to an embodiment of the present invention. As shown, the pair is separated and each of the wires is coupled respectively to a first and second powerline cable, which can be a neutral and power cable. Each of the wires is coupled via a ferrite core coupler according to a specific embodiment. As shown, the twisted pair is crimped or clamped together at a termination region 675 according to a specific embodiment. A powerline signal traverse through the twisted pair and couples to the powerline cables as shown. Of course, there can be other variations, modifications, and alternatives.

Figure 7:
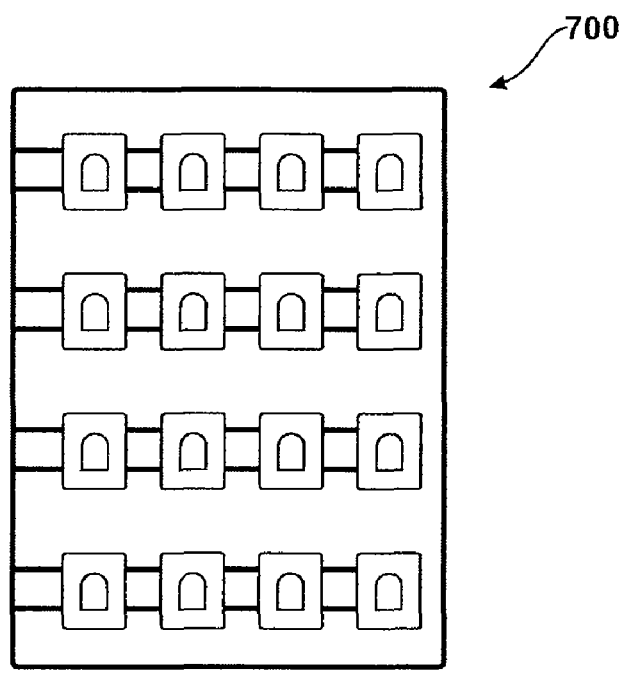
FIG. 7 is a simplified diagram of a power panel according to an embodiment of the present invention.
Figure 7A:
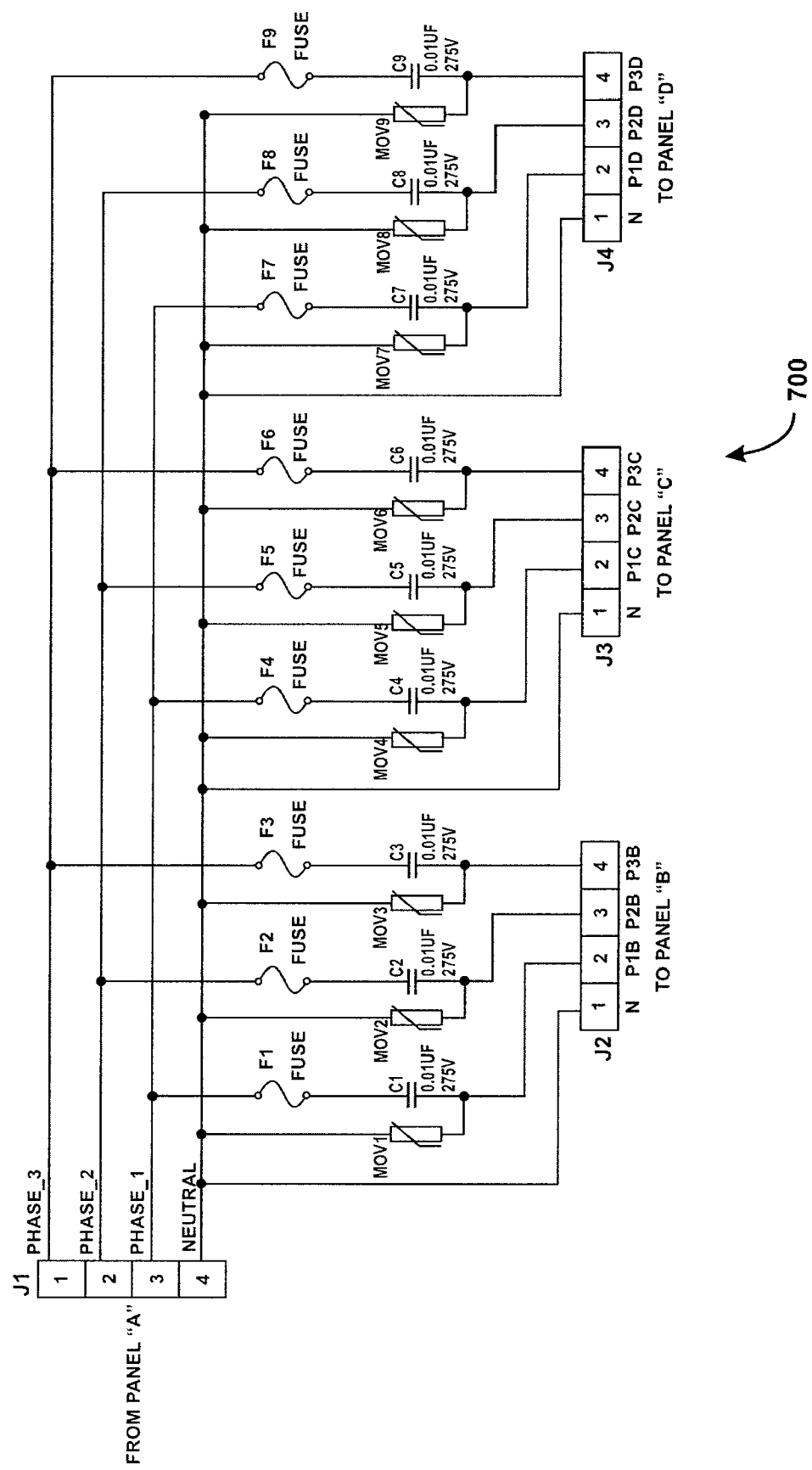
FIG. 7A is a more detailed diagram of a power panel according to an embodiment of the present invention.

FIG. 7 is a simplified diagram of a power panel 700 according to an embodiment of the present invention. This diagram is merely an example, which should not unduly limit the scope of the claims herein. One of ordinary skill in the art would recognize many variations, alternatives, and modifications. As shown is a power panel, which often resides within an interior or exterior of a building. The power panel includes multiple phases, which are derived from a public utility or the like. The power panel often includes an array of connector devices, which couple to a set of powerline cables that are distributed physically to one or more regions of a building, office, house, or the like. Each of the connector devices often include an outgoing set of wiring, which includes a phase 1, phase, 2, phase 3, and neutral. An example of such a power panel 700 is shown in FIG. 7A. Of course, there can be other variations, modifications, and alternatives.

Figure 8:
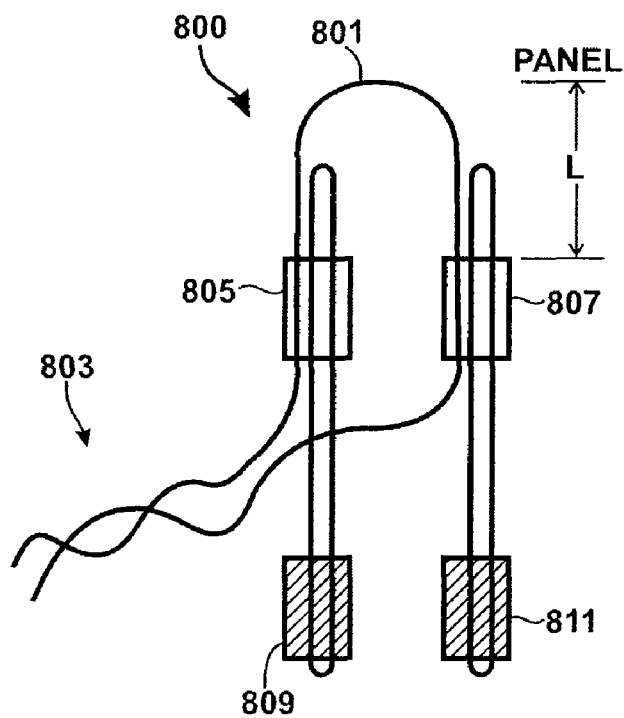
FIG. 8 is a simplified diagram of a twisted pair coupled to a pair of powerline cables according to an embodiment of the present invention.

FIG. 8 is a simplified diagram 800 of a twisted pair coupled to a pair of powerline cables according to an embodiment of the present invention. This diagram is merely an example, which should not unduly limit the scope of the claims herein. One of ordinary skill in the art would recognize many variations, alternatives, and modifications. In a specific embodiment, the system has a loop 801 configured from the first wire connected to the second wires and extends as the twisted pair of wires 803. In a specific embodiment, the first wire is coupled to the first male connector and the second wire is coupled to the second male connector. The system also has a first powerline cable and a second powerline cable coupled to the first powerline cable. The system has a first inductive coupling device 805 coupling a first portion of the first wire within a vicinity of the loop to the first powerline cable and a second inductive coupling 807 device coupling a first portion of the second wire within a vicinity of the loop to the second powerline cable. As shown, the loop includes an extension L, which protrudes beyond each of the inductive coupling devices. In a specific embodiment, the loop is no longer than about six inches or so. As also shown are a pair of magnetic coils 809 811. Each of the coils is configured to prevent and/or suppress telecommunication signals from traversing down the cable in an undesirable direction according to an a specific embodiment. Of course, depending upon the embodiment, the loop can be separated and then reattached using a crimp or clamp to terminate the ends together. Of course, there can be other variations, modifications, and alternatives.

Figure 9:
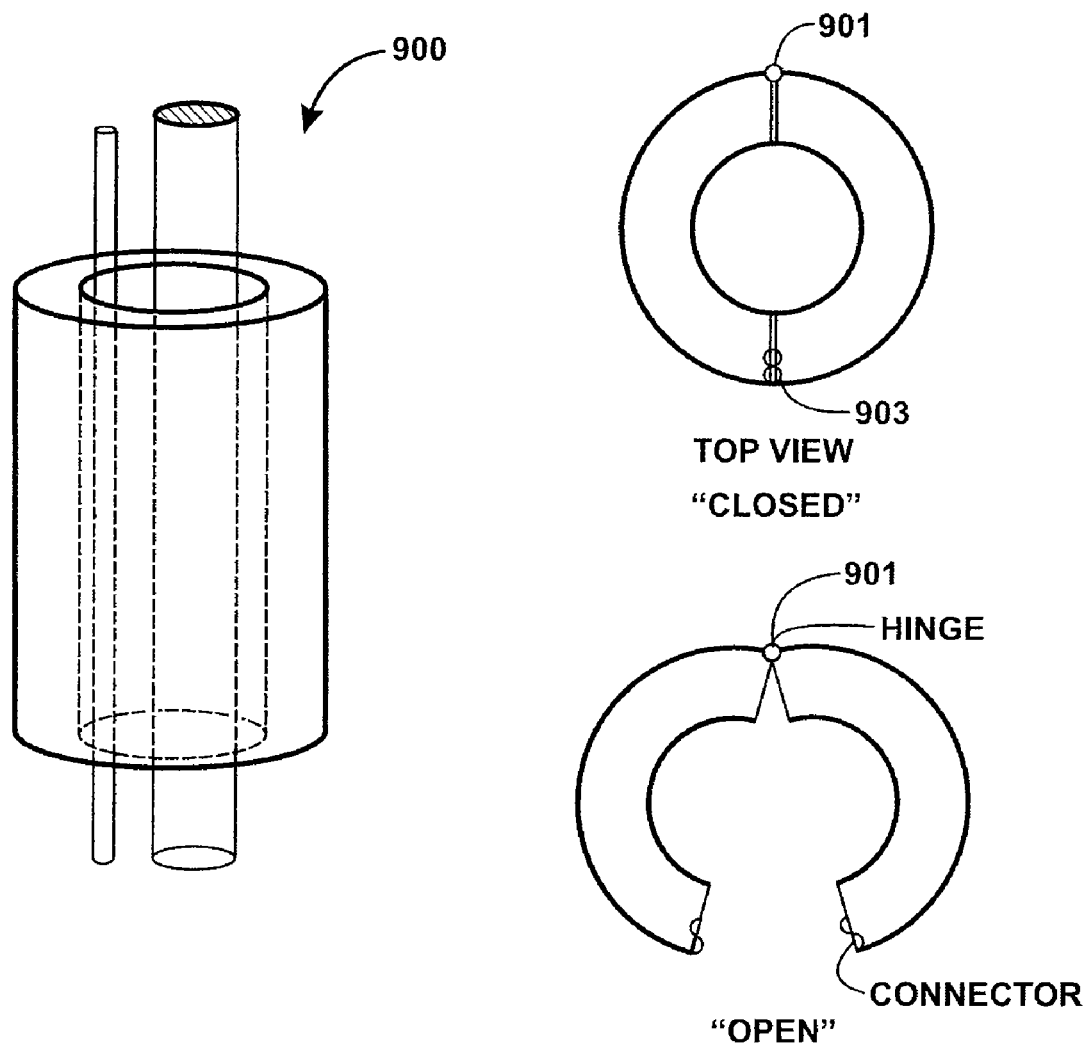
FIG. 9 is a simplified diagram of an inductive coupling device according to an embodiment of the present invention.

Referring to FIG. 9, in a preferred embodiment, the inductive coupling device system has a first mechanical hinge 901 and connector device 903 configured to couple the first inductive coupling device to the portion of the first wire within the vicinity of the loop without causing physical damage to the portion of the first wire. As shown, is an "open" and "closed" configuration. Additionally, the system includes a second mechanical hinge and connector device configured to couple the second inductive coupling device to the portion of the second wire within the vicinity of the loop without causing physical damage to the portion of the second wire. In a preferred embodiment, one of the twisted pair and cable can slide within the inner region of the inductive coupling devices. Of course, there can be other variations, modifications, and alternatives.

Figure 10:
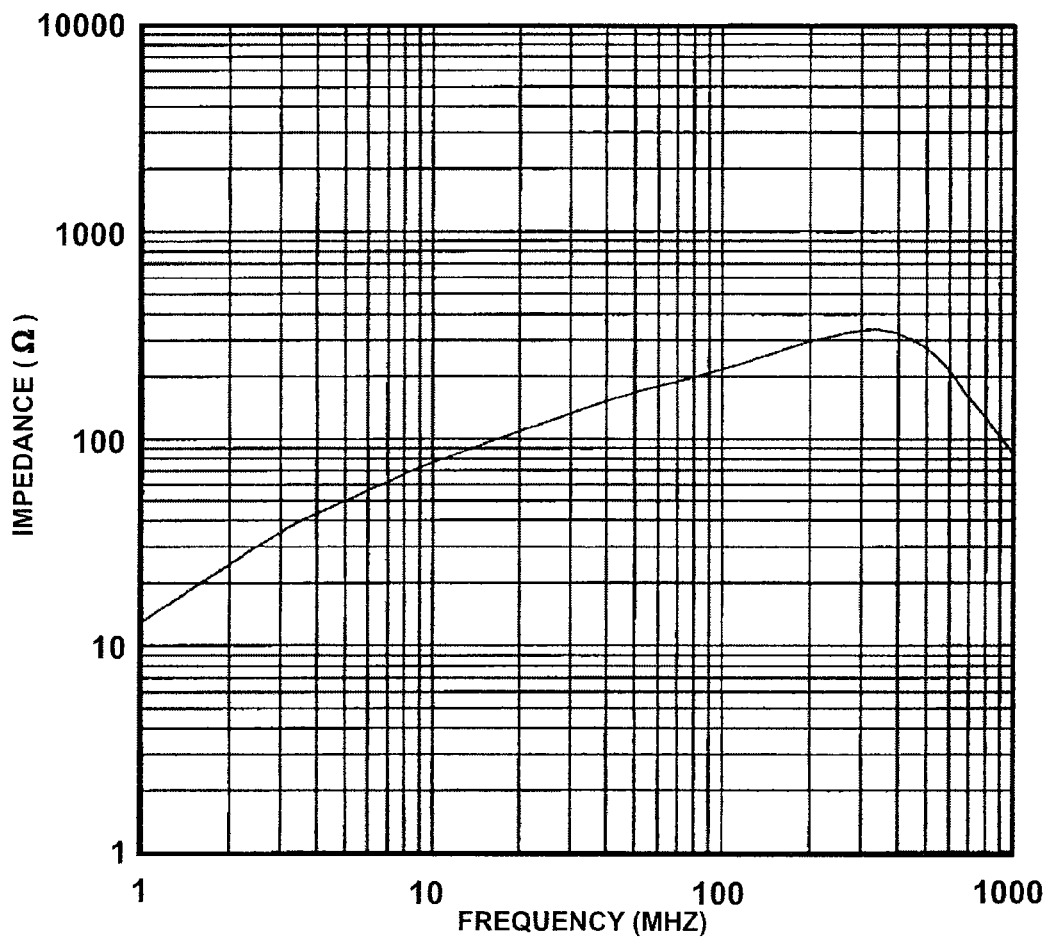
FIG. 10 is a simplified diagram of a frequency plotted against impedance for a magnetic coil for suppressing noise according to an embodiment of the present invention.

In a preferred embodiment, the system also includes a magnetic coil, which is coupled to each of the powerline cables to suppress the digital communication signal. As shown, the magnetic coil is configured to suppress the telecommunication signal from leaking out back down the powerline cable in an indesirable direction according to a specific embodiment. In a specific embodiment, the magnetic coil has an opened and closed configuration and can be coupled around a periphery of each of the powerline cables. As an example, the magnetic coil can be a magnetic coil sold under part Number MRC-1329B by Ming Ci Electronics Ltd., but can be others. An impedance (in ohms) plotted against frequency (MHz) of such a magnetic coil is illustrated by FIG. 10. Of course, there can be other variations, modifications, and alternatives.

Figure 11:
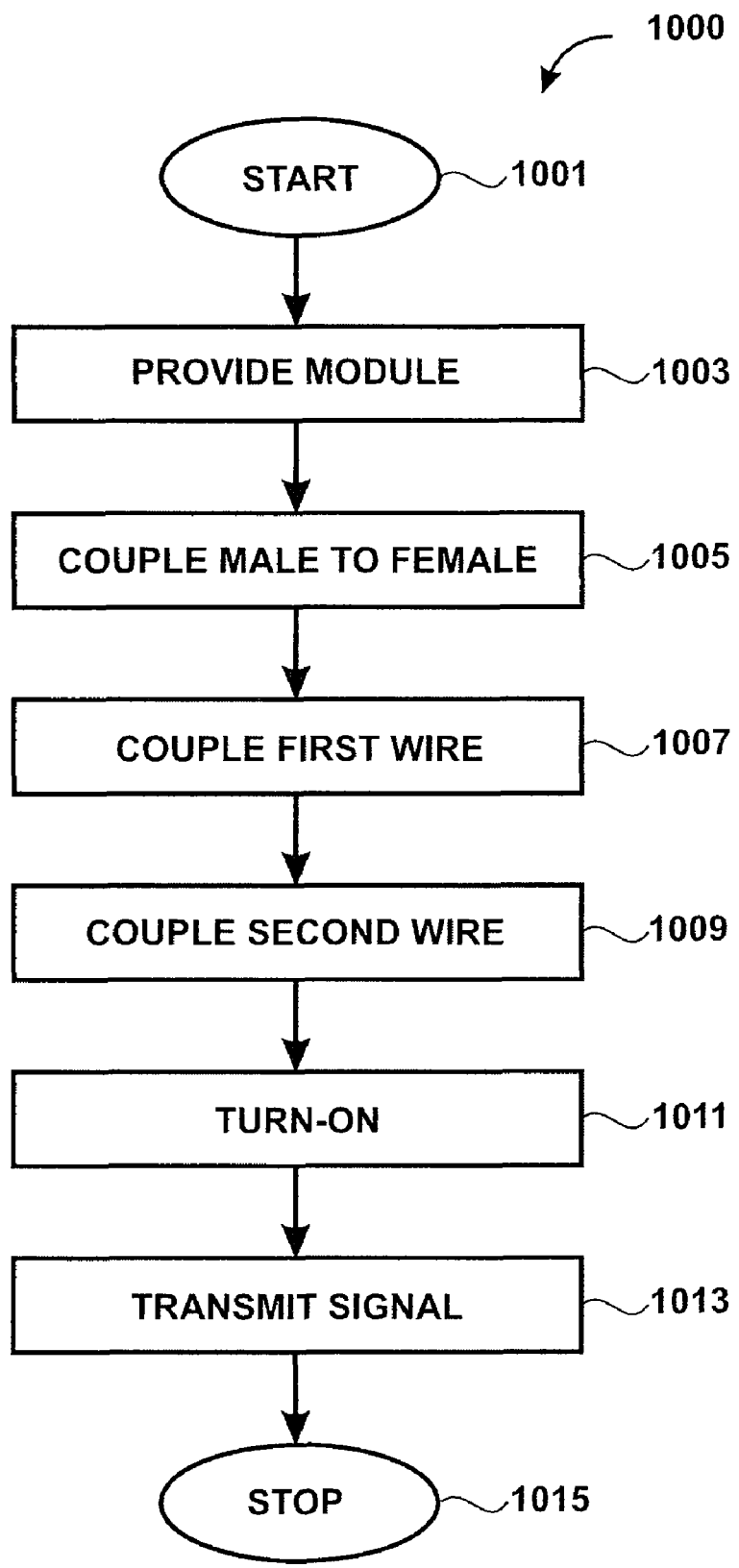
FIG. 11 is a simplified flow diagram of a method of integrating a non-intrusive coupling device to a powerline network according to an embodiment of the present invention.

FIG. 11 is a simplified flow diagram 1000 of a method of integrating a non-intrusive coupling device to a powerline network according to an embodiment of the present invention. This diagram is merely an example, which should not unduly limit the scope of the claims herein. One of ordinary skill in the art would recognize many variations, alternatives, and modifications. As shown, the method begins with start, step 1001. The flow chart illustrates a method of converting a powerline into a telecommunication network. The method includes providing a powerline module couple to a data connection. The powerline module 1003 is configured to process a first data signal in a first format to a second data signal in a second format, which is in the second format that is an OFDM format. In a specific embodiment, the powerline module is coupled to a physical socket, which comprising a female connector device. The female connector device includes at least a first connector and a second connector.

Referring to the Figure, the method couples 1005 a male connector device into the female connector device. In a specific embodiment, the male connector includes at least a first male connector and a second male connector coupled respectively to the first connector and the second connector. The first male connector is coupled to a first wire. The second male connector is coupled to a second wire. The first wire and the second wire are configured as a twisted pair of wires extending from the male connector and having a length of no greater than fifty feet. The twisted pair comprises a loop configured from the first wire connected to the second wire.

As shown, the method includes coupling a first portion of the first wire 1007 within a vicinity of the loop to the first powerline cable using a first inductive coupling device comprising a first mechanical hinge and connector device configured to couple the first inductive coupling device to the portion of the first wire within the vicinity of the loop without causing physical damage to the portion of the first wire. The method also couples a first portion of the second wire 1009 within a vicinity of the loop to the second powerline cable using a second inductive coupling device comprising a second mechanical hinge and connector device configured to couple the second inductive coupling device to the portion of the second wire within the vicinity of the loop without causing physical damage to the portion of the second wire. As shown, the method also turns-on, step 1011, the powerline network module and transmits (step 1013) powerline signals through the twisted pair and couple to the powerline cables. In a specific embodiment, the method stops, step 1015. Of course, there can be various modifications, alternatives, and variations.

Figure 12:
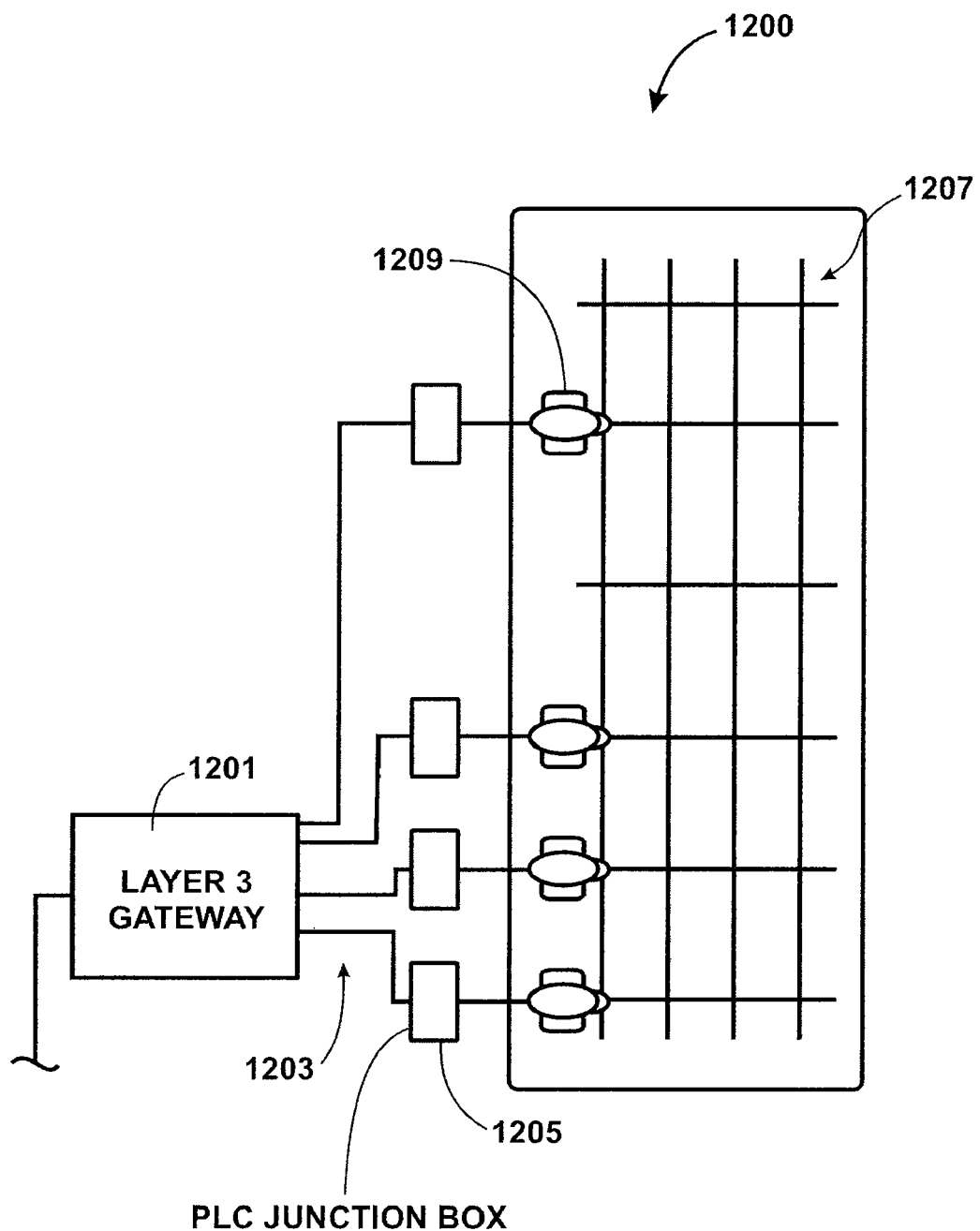
FIG. 12 is a simplified diagram illustrating a gateway box coupled to a plurality of powerline junction boxes according to an embodiment of the present invention.

FIG. 12 is a simplified diagram 1200 illustrating a gateway box coupled to a plurality of powerline junction boxes according to an embodiment of the present invention. This diagram is merely an example, which should not unduly limit the scope of the claims herein. One of ordinary skill in the art would recognize other variations, modifications, and alternatives. As shown, the diagram includes a gateway box 1201, which is coupled to a data connection. The gateway box can be a Layer 3 protocol switch, which includes a variety of functions. As an example, the switch can be configured for address LAN routing for enterprise applications. Depending upon the embodiment, the Layer 3 switch can include Quality of Service (QoS) and security and management tools. Example of the Layer 3 switch can be available from Dell Computers, Cisco Systems, and other companies. The Layer 3 switch includes a plurality of input/output ports, as shown.

Each of the ports can be wired 1203 to a powerline junction box 1205. The powerline junction box can be similar to the one illustrated by way of the previous description and Figures but can also be others. The powerline junction box includes a connection via coaxial cable to the Layer 3 switch. The junction box has one or more twisted pairs, which couple 1209 to powerline cables that are distributed in a building or other structures. Each of the junction boxes has one or more twisted pairs, which coupled to powerline cables, as shown. Of course, there can be other variations, modifications, and alternatives.

Figure 13:
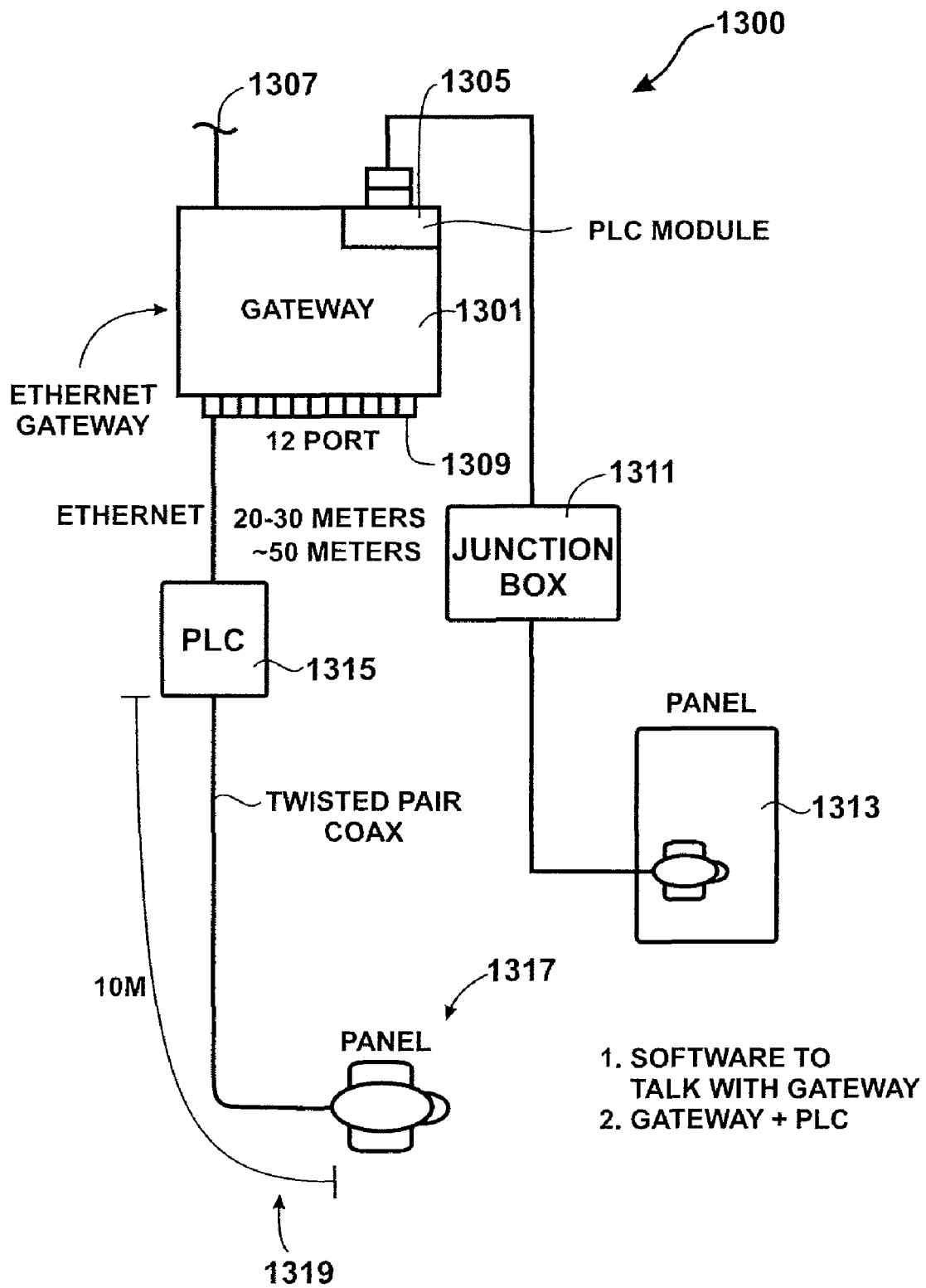
FIG. 13 is a simplified diagram illustrating an alternative gateway box coupled to a plurality of powerline junction boxes according to an embodiment of the present invention.

FIG. 13 is a simplified diagram 1300 illustrating an alternative gateway box coupled to a plurality of powerline junction boxes according to an embodiment of the present invention. This diagram is merely an example, which should not unduly limit the scope of the claims herein. One of ordinary skill in the art would recognize other variations, modifications, and alternatives. As shown, the diagram 1300 includes a gateway 1301, which can be a Layer 3 gateway. The Layer 3 gateway includes a powerline communication module 1305, which covers, for example, a data signal to a format suitable for powerline communication. In a specific embodiment. the powerline communication module is coupled to a powerline junction box 1311, which is coupled to a panel 1313 using an inductive coupling device, which has been described throughout the present specification. The gateway also includes a plurality of input/output ports 1309. Each of the input/output ports can coupled to a powerline communication module using, for example, an Ethernet cable, which can have a length of about twenty to about fifty meters according to a specific embodiment. The module outputs a twisted pair that inductively couples using the coupling device to a panel 1307. In a specific embodiment, the twisted pair can be a suitable length 1319 such as about ten or so meters and less. A combination of the Ethernet cable, powerline module, and twisted pair allow for suitable communication using a length of wire/cable of about twenty to about sixty meters according to a specific embodiment. Of course, there can be other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A powerline system including non-intrusive coupling for powerline communications, the system comprising:
    a powerline module coupled to a data connection, the powerline module being configured to process a first data signal in a first format to a second data signal in a second format, the second data signal in the second format is an orthogonal frequency divisional multiplexing (OFDM) format;
    a physical socket coupled to the powerline module, the physical socket comprising a female connector device, the female connector device including at least a first connector and a second connector, the first connector and the second connector being coupled to the second data signal in the second format;
    a male connector device, the male connector device being inserted into the female connector device, the male connector device including at least a first male connector and a second male connector coupled respectively to the first connector and the second connector;
    a first wire coupled to the first male connector;
    a second wire coupled to the second male connector;
    a twisted pair of wires including at least the first wire and the second wire, the twisted pair of wires extending from the male connector and having a length of no greater than fifty feet;
    a loop configured from the first wire connected to the second wires and extending as the twisted pair of wires, the first wire coupled to the first male connector and the second wire coupled to the second male connector;
    a first powerline cable;
    a second powerline cable coupled to the first powerline cable;
    a first inductive coupling device coupling a first portion of the first wire within a vicinity of the loop to the first powerline cable;
    a second inductive coupling device coupling a first portion of the second wire within a vicinity of the loop to the second powerline cable;
    a first mechanical hinge and connector device configured to couple the first inductive coupling device to the first portion of the first wire within the vicinity of the loop without causing physical damage to the first portion of the first wire; and
    a second mechanical hinge and connector device configured to couple the second inductive coupling device to the first portion of the second wire within the vicinity of the loop without causing physical damage to the first portion of the second wire.

2. The powerline system of claim 1 further comprising a first magnetic coil coupled to a first portion of the first powerline cable to suppress the second data signal.

3. The powerline system of claim 2 wherein the first magnetic coil is firmly attached to the first portion of the first powerline cable to suppress the second data signal.

4. The powerline system of claim 1 further comprising a second magnetic coil coupled to a first portion of the second powerline cable to suppress the second data signal.

5. The powerline system of claim 4 wherein the second magnetic coil is firmly attached to the first portion of the second powerline cable.

6. The powerline system of claim 3 wherein the first powerline cable is coupled to the second powerline cable to form a loop at a first end, the first powerline cable including the second portion of the first powerline cable having the suppressed second data signal, the second powerline cable including the second portion of the second powerline cable having the suppressed second data signal; whereupon the loop transmits the second data signal through the first powerline cable and the second powerline cable.

7. The powerline system of claim 1 further comprising an electrical junction box comprising the first powerline cable and the second powerline cable.

8. The powerline system of claim 1 wherein the male connector device comprises an RF 45 connector.

9. The powerline system of claim 1 wherein the male connector device 2 comprises a twisted pair of wires, a second twisted pair of wires, a third twisted pair of wires, and a fourth twisted pair of wires.

10. The powerline system of claim 1 wherein the loop comprises a termination end, the termination end comprising a crimp or a mechanical connector.

11. A method of converting a powerline into a telecommunication network, the method comprising:
    providing a powerline module coupled to a data connection, the powerline module being configured to process a first data signal in a first format to a second data signal in a second format, the second data signal in the second format is an orthogonal frequency divisional multiplexing (OFDM) format, the powerline module being coupled to a physical socket, the physical socket comprising a female connector device, the female connector device including at least a first connector and a second connector, the first connector and the second connector being coupled to the second data signal in the second format;

coupling a male connector device into the female connector device, the male connector including at least a first male connector and a second male connector coupled respectively to the first connector and the second connector, the first male connector being coupled to a first wire, the second male connector being coupled to a second wire, the first wire and the second wire being configured as a twisted pair of wires extending from the male connector and having a length of no greater than fifty feet, the twisted pair comprising a loop configured from the first wire connected to the second wire;

coupling a first portion of the first wire within a vicinity of the loop to the first powerline cable using a first inductive coupling device comprising a first mechanical hinge and connector device configured to couple the first inductive coupling device to the first portion of the first wire within the vicinity of the loop without causing physical damage to the first portion of the first wire; and coupling a first portion of the second wire within a vicinity of the loop to the second powerline cable using a second inductive coupling device comprising a second mechanical hinge and connector device configured to couple the second inductive coupling device to the first portion of the second wire within the vicinity of the loop without causing physical damage to the first portion of the second wire.

12. The method of claim 11 wherein the data connection is from a Layer 3 switch, the Layer 3 switch having an input/output port coupled to the data connection.

13. The method of claim 11 wherein the coupling of the first portion of the first wire and the coupling of the first portion of the second wire are provided using a non-intrusive process.

14. The method of claim 11 wherein the first inductive coupling device comprises an open position and a closed position.

15. The method of claim 11 wherein the second inductive coupling device comprises an open position and a closed position.

16. The method of claim 11 wherein the data connection is an Ethernet connection.

17. The method of claim 11 further comprising transferring the second data signal from the second wire to the second powerline cable.

18. The method of claim 11 further comprising transferring the second data signal from the first wire to the second powerline cable.

19. The method of claim 11 wherein the data connection is provided by a Layer 3 switching device.

20. The method of claim 12 wherein the Layer 3 switching device comprises a QoS process.

21. The method of claim 11 wherein the powerline module is provided within a housing of the Layer 3 switching device.

22. The method of claim 11 wherein the powerline module is coupled to the data connection via an Ethernet cable coupled to a Layer 3 switching device.

23. The method of claim 11 wherein first the portion of the first wire is undamaged and substantially retains an overlying first insulating material and the first portion of the second wire is undamaged and substantially retains an overlying second insulating material.

* * * * *